United States Patent Office 3,550,446
Patented Dec. 29, 1970

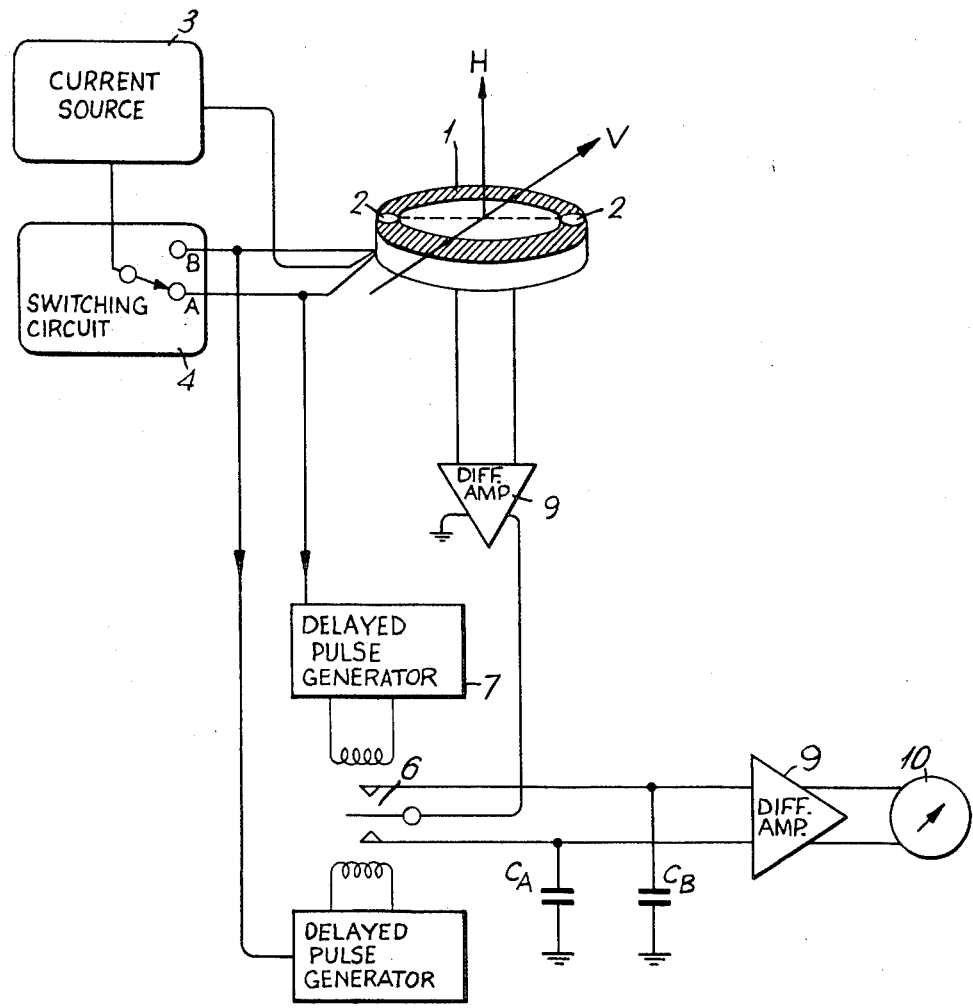

3,550,446
ELECTROMAGNETIC FLOWMETERS
Malcolm John Tucker and Norman Dennis Smith, Godalming, Surrey, England, assignors to National Research Development Corporation, London, England, a British corporation
Filed Feb. 28, 1969, Ser. No. 803,322
Int. Cl. G01f 1/00
U.S. Cl. 73—194                                  3 Claims

ABSTRACT OF THE DISCLOSURE

In an electromagnetic flowmeter the magnetic field is supplied from a DC source which is switched to cause the magnetic field to alternate between two opposite directions. E.M.F.'s generated by fluid flow are sampled in each switching period after a delay to allow transients to die away and the difference between successive samples taken when the magnetic field is in respective opposite directions is indicated to give a measure of fluid flow velocity independently of any electrochemical E.M.F.'s.

---

This invention relates to electromagnetic flowmeters.

The principle of the electromagnetic flowmeter is that fluid, the flow of which it is desired to measure flows through a magnetic field in a direction having at least a component orthogonal to the magnetic field and the moving fluid acting as a moving conductor has an E.M.F. induced in it which is measured by a suitably placed pair of electrodes and which is an indication of fluid velocity. The small induced E.M.F.'s are liable to be swamped by electrochemical E.M.F.'s if the magnetic field is generated by a D.C. current and it has therefore been the custom to use A.C. to generate the magnetic field. However when using sinusoidal current great care has to be taken to minimise E.M.F.'s induced between the electrodes by direct electromagnetic and capacitative coupling. Even so quite large induced voltages are left and these need to be balanced out.

It is an object of the present invention to provide an electromagnetic flowmeter in which these effects are overcome.

According to the present invention an electromagnetic flowmeter for measuring the velocity of a fluid comprises a magnetic field generator for generating a magnetic field alternately in two opposite directions, the generator providing a magnetic field which has at least a component orthogonal to the direction of fluid flow which it is desired to measure, electrode means positioned in the fluid for measuring potential gradients set up thereacross, means for sampling the E.M.F.'s measured by the electrode means under steady state conditions in each direction of the magnetic field, and means for indicating the difference between the two sampled E.M.F.'s.

It will be understood that the difference between the two E.M.F.'s is proportional to the velocity of the fluid in a direction normal to the magnetic field.

In carrying out the invention a delay means may be incorporated for delaying the sampling of the respective E.M.F.'s for small periods of time immediately after the reversals of the magnetic field to allow steady state conditions to be reached.

In an embodiment of the invention the magnetic field generator may comprise a centre-tapped coil, D.C. current generator and a switching circuit which alternately switches the output of the current generator to the two ends of the coil.

In order that the invention may be more fully understood reference will now be made to the accompanying drawing which illustrates in block diagrammatic form a flowmeter embodying the invention.

Referring now to the drawing a coil 1 has a vertical axis and carries a pair of electrodes 2, one at each end of a diameter of the coil. The fluid, the velocity of which it is desired to measure, flows through the coil and in general the direction of the fluid flow at a velocity V will be at an angle $\theta$ to the line joining the electrodes. Current flowing through the coil generates a magnetic field H in a vertical direction which can be either upwards as marked or downwards depending on the direction of current flow in coil 1. The flow of fluid in this magnetic field causes the generation of a potential gradient which is orthogonal to both the magnetic field H and the direction of the fluid velocity V, the E.M.F. between the electrodes 2 being proportional to HV sin $\theta$. Coil 1 is centre-tapped and is supplied with direct current from a current source 3 through a switching circuit 4. The centre tap of coil 1 is directly connected to current source 3 while the two ends of the coil marked A and B are connected to the switching circuit 4 in which the current from source 3 is alternately switched to terminal A and terminal B by means of switching transistors or the like.

With a direct current through the coil, the E.M.F. between electrodes 2 includes a component due to the fluid flowing through the magnetic field together with components due to other sources such as electrochemical effects between the electrodes. If the magnetic field is reversed, the component due to fluid flow is also reversed but the electrochemical effects are unaffected. Means are therefore provided for measuring the difference between the E.M.F.'s between electrodes 2 when the magnetic field is reversed by operation of switching circuit 4. This difference will be independent of any electrochemical E.M.F.'s and will be a measure of the E.M.F. induced by fluid flow alone.

The reversal of the magnetic field induces transient voltages in the electrode circuit and accordingly the E.M.F. between electrodes 2 is sampled only after a delay period during which the transients will have died away. Electrodes 2 are connected to a differential amplifier 5 the output of which feeds a two-way switch 6, the two outputs of which are connected respectively to a storage capacitor CA and a storage capacitor CB. Switch 6 is controlled by two delayed pulse generators 7 and 8. The outputs stored in capacitors CA and CB are measured by a further amplifier 9 and indicated on an indicator 10.

The sequence of operation of the flowmeter is that when the switching circuit 4 connects the current to terminal A delayed pulse generator 7 is energised at the same time but does not operate switch 6 until after an interval of time during which transients die away and the delayed pulse generator then operates to connect the output of differential amplifier 5 to capacitor CA which becomes charged to a voltage proportional to the E.M.F. then standing between the electrodes 2. Switching circuit 4 thereafter operates to switch the current to terminal B which reverses the polarity of the magnetic field in coil 1 and at the same time de-energises generator 7 to disconnect differential amplifier 5 from capacitor CA. Delayed pulse generator 8 is now energised and after an interval to allow the transients to die away, delayed pulse generator 8 then connects the output of differential amplifier 5 to capacitor CB. Both capacitors CA and CB hold their charges when disconnected from amplifier 5 so that the standing difference in their potentials is proportional to the component in the electrode voltage caused by fluid flow. This difference in potential is amplified in amplifier 9 and displayed on indicator 10 calibrated in terms of fluid velocity. A single pair of electrodes measures the component of the fluid velocity perpendicular to the line joining them. By adding a second pair of electrodes in the same plane as the first but at right angles to them, both components of flow may be measured.

This equipment has an application for use as a ship's log, with the advantage that it can be used to measure not only the forward component of the ship's speed, but also the sideways drift of the ship. The measuring head is mounted on the end of a spar projecting below the ship's bottom, and consists of a coil with a vertical axis in an ellipsodial housing which also carries on its surface a pair of electrodes on a fore-and-aft axis and another on an athwartships axis. The sea water flowing through the magnetic field produced by the coil generates an E.M.F. orthogonal to both the field and the velocity. The two electrode pairs therefore pick up voltages proportional to the athwartships and fore-and-aft components of the water velocity.

A coil of 10 cm. diameter has been used and it was found that a power supply of approximately 10 watts to the coil gave a sensitivity of about 75 $\mu$v./knot. A period of 20 ms. was allowed for the transients to die away after energising the coil before connecting the output of the differential amplifier to either of the capacitors. In the practical circuit the switching was performed by transistors and it was found that if the electrical zero was set up by shorting the amplifier inputs, the change of zero in still water was less than 0.1 knot.

We claim:

1. An electromagnetic flowmeter for measuring the velocity of a fluid comprising a magnetic field generator for generating a magnetic field alternately in two opposite directions, the generator providing a magnetic field which has at least a component orthogonal to the direction of fluid flow which it is desired to measure, electrode means positioned in the fluid for measuring potential gradients set up thereacross, means for sampling and storing the E.M.F.'s measured by the electrode means under steady state conditions in each direction of the magnetic field, and means for indicating the difference between the two stored E.M.F.'s.

2. A flowmeter as claimed in claim 1 in which delay means are incorporated for delaying the sampling of the respective E.M.F.'s for small periods of time immediately after the reversals of the magnetic field to allow steady state condition to be reached.

3. A flowmeter as claimed in claim 1 in which the magnetic field generator comprises a centre-tapped coil, a D.C. current generator and a switching circuit which alternately switches the output of the current generator to the two ends of the coil.

References Cited

UNITED STATES PATENTS

| | | | |
|---|---|---|---|
| 3,449,951 | 6/1969 | Westersten | 73—194 |
| 3,339,410 | 9/1967 | Steru | 73—194 |
| 3,329,018 | 7/1967 | Hognestad | 73—194 |

RICHARD C. QUEISSER, Primary Examiner

J. WHALEN, Assistant Examiner